United States Patent
Hallale et al.

(10) Patent No.: US 11,457,567 B2
(45) Date of Patent: Oct. 4, 2022

(54) NEEDLE COUPLING AND FRAME ASSEMBLY FOR AGRICULTURAL MACHINE

(71) Applicant: Deere & Company, Moline, IL (US)

(72) Inventors: Sanjeev M. Hallale, Pune (IN); Mohamad S. El-Zein, Bettendorf, IA (US); Nathan F. Tortorella, Bettendorf, IA (US); Amol M. Sawale, Pune (IN); Hector Portillo, Monterrey (MX); Darin L. Roth, Batavia, IA (US)

(73) Assignee: DEERE & COMPANY, Moline, IL (US)

( * ) Notice: Subject to any disclaimer, the term of this patent is extended or adjusted under 35 U.S.C. 154(b) by 649 days.

(21) Appl. No.: 16/459,040

(22) Filed: Jul. 1, 2019

(65) Prior Publication Data

US 2021/0000014 A1  Jan. 7, 2021

(51) Int. Cl.
*A01F 15/04* (2006.01)
*A01F 15/07* (2006.01)
*A01F 15/08* (2006.01)
*A01D 59/06* (2006.01)
*A01F 15/12* (2006.01)

(52) U.S. Cl.
CPC ............ *A01D 59/06* (2013.01); *A01F 15/04* (2013.01); *A01F 15/071* (2013.01); *A01F 15/08* (2013.01); *A01F 15/12* (2013.01); *A01F 2015/073* (2013.01)

(58) Field of Classification Search
CPC ........ A01F 15/071; A01F 15/08; A01F 15/04; A01F 15/12; A01F 2015/073; A01F 2015/143; A01D 59/06
See application file for complete search history.

(56) References Cited

U.S. PATENT DOCUMENTS

| | | | |
|---|---|---|---|
| 3,027,825 A | | 4/1962 | Nolt et al. |
| 3,036,514 A | * | 5/1962 | McDuffie ................ A01F 15/14 |
| | | | 248/230.5 |
| 3,550,969 A | * | 12/1970 | Robinson ............. F16B 7/0493 |
| | | | 403/392 |
| 4,102,261 A | * | 7/1978 | White ..................... F16B 7/048 |
| | | | 403/4 |

(Continued)

FOREIGN PATENT DOCUMENTS

DE  20203060 U1  7/2003
EP  2198687 A1  6/2010
(Continued)

OTHER PUBLICATIONS

European Search Report issued in counterpart application No. 20182175.8 dated Nov. 23, 2020 (13 pages).

(Continued)

*Primary Examiner* — Jimmy T Nguyen
(74) *Attorney, Agent, or Firm* — Michael Best & Friedrich LLP

(57) ABSTRACT

An agricultural harvesting machine includes a binding mechanism to secure binding material around a crop package and a delivery device to wrap binding material around a portion of the crop package and provide binding material to the binding mechanism. The delivery device includes a yoke, a needle coupling connected to the yoke, and a needle connected to the needle coupling.

20 Claims, 18 Drawing Sheets

(56)  References Cited

U.S. PATENT DOCUMENTS

| | | | |
|---|---|---|---|
| 4,310,186 A * | 1/1982 | Vansteelant | A01F 15/145 |
| | | | 289/14 |
| 5,156,085 A * | 10/1992 | Bossche | A01F 15/0858 |
| | | | 100/189 |
| 7,458,620 B2 * | 12/2008 | Rotole | A01F 15/12 |
| | | | 289/16 |
| 9,936,646 B2 | 4/2018 | Demulder et al. | |
| 2013/0118366 A1 | 5/2013 | Esau et al. | |
| 2018/0098501 A1 | 4/2018 | Kraus | |
| 2018/0098506 A1 * | 4/2018 | Kraus | B30B 9/3057 |
| 2018/0116123 A1 | 5/2018 | Chaney | |
| 2019/0000017 A1 * | 1/2019 | Kreyenhagen | A01F 15/141 |

FOREIGN PATENT DOCUMENTS

| | | |
|---|---|---|
| EP | 3020268 A1 | 5/2016 |
| EP | 3315017 A1 | 5/2018 |
| EP | 3391728 A1 | 10/2018 |

OTHER PUBLICATIONS

European Search Report issued in counterpart application No. 20182171.7 dated Nov. 23, 2020 (08 pages).
Images of Claas Quadrant LSB needle carriage tube, publicly available at least as early as 2018 (1 page).

* cited by examiner

US 11,457,567 B2

NEEDLE COUPLING AND FRAME ASSEMBLY FOR AGRICULTURAL MACHINE

FIELD

The present disclosure relates to agricultural harvesting machines having a binding system for securing binding material around a crop package.

BACKGROUND

Agricultural balers gather, compress, and shape crop material into a bale. There are different types of balers which create rectangular or square bales or cylindrical or round bales. Bales can be bound with netting, strapping, wire, or twine. A baler that produces small rectangular bales is often referred to as a square baler. Another type of baler is one that produces large rectangular bales, often referred to as large square baler.

Large square balers have been used in crop harvesting for many years. Large square balers usually utilize a compression system including a gearbox with a crank arm and connecting rod which is attached to a plunger. During each rotation of the crank arm, the plunger compresses the crop in a baling chamber as the plunger moves towards the rear of the baler. Crop is usually metered from a pre-compression chamber into the baler chamber. Large square balers usually include a knotter system for tying twine around the bale before the bale is ejected from the baler chamber. Needles delivery twine through the baling chamber to the knotter system.

The need for increased productivity is motivation to develop faster, more efficient equipment. Designing machines with relatively low density materials, such as Aluminum, can enable drastic improvements in efficiency. In a large square baler, the binding system accelerates from rest very quickly, followed by braking system at the peak of the stroke. Light weight designs will reduce the power required to operate this system. The drive mechanism and braking system may be simplified and minimized. The baler may be also driven at a faster rate because the binding system can move at a faster rate.

SUMMARY

According to some embodiments, an agricultural harvesting machine includes a binding mechanism to secure binding material around a crop package and a delivery device to wrap binding material around a portion of the crop package and provide binding material to the binding mechanism. The delivery device includes a yoke, a needle coupling connected to the yoke, and a needle connected to the needle coupling.

According to some embodiments, an agricultural harvesting machine includes a binding mechanism to secure binding material around a crop package and a delivery device to wrap binding material around a portion of the crop package and provide binding material to the binding mechanism. The delivery device includes a yoke extending along a longitudinal axis. A needle coupling is connected to the yoke. The needle coupling includes a base having an outer portion, a first rim extending from the outer portion, a second rim extending from the outer portion, a first upper flange, and a first lower flange. A needle is connected to the needle coupling. The needle includes a tip and a footing. The footing has a curved wall extending between a second upper flange and a second lower flange. The needle is connected to a needle coupling by a first fastener extending through the first upper flange and the second upper flange, a second fastener extending through the first lower flange and the second lower flange. Adjustment of the first fastener and the second fastener adjusts the position of the tip relative to the yoke.

According to some embodiments, an agricultural harvesting machine includes a binding mechanism to secure binding material around a crop package and a delivery device to wrap binding material around a portion of the crop package and provide binding material to the binding mechanism. The delivery device includes a yoke extending along a longitudinal axis. A needle coupling is connected to the yoke. The needle coupling includes a base having an outer portion, a first rim extending at an oblique angle from the outer portion, a second rim extending at an oblique angle from the outer portion, a first upper flange, and a first lower flange. The first and second rims at least partially define a tapered groove. A needle is connected to the needle coupling. The needle includes a tip and a footing. The footing has a curved wall extending between a second upper flange and a second lower flange. The needle is connected to a needle coupling by a first fastener extending through the first upper flange and the second upper flange, a second fastener extending through the first lower flange and the second lower flange, and the curved wall positioned in the tapered groove.

According to some embodiments, an agricultural harvesting machine includes a binding mechanism to secure binding material around a crop package and a delivery device to wrap binding material around a portion of the crop package and provide binding material to the binding mechanism. The delivery device includes a yoke extending along a longitudinal axis. A needle coupling is connected to the yoke. The needle coupling includes a base and a collar removably connected to the base. A needle is connected to the needle coupling. The needle includes a tip and a footing. The connection between the collar and the base secures the position of the needle relative to the longitudinal axis of the yoke.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
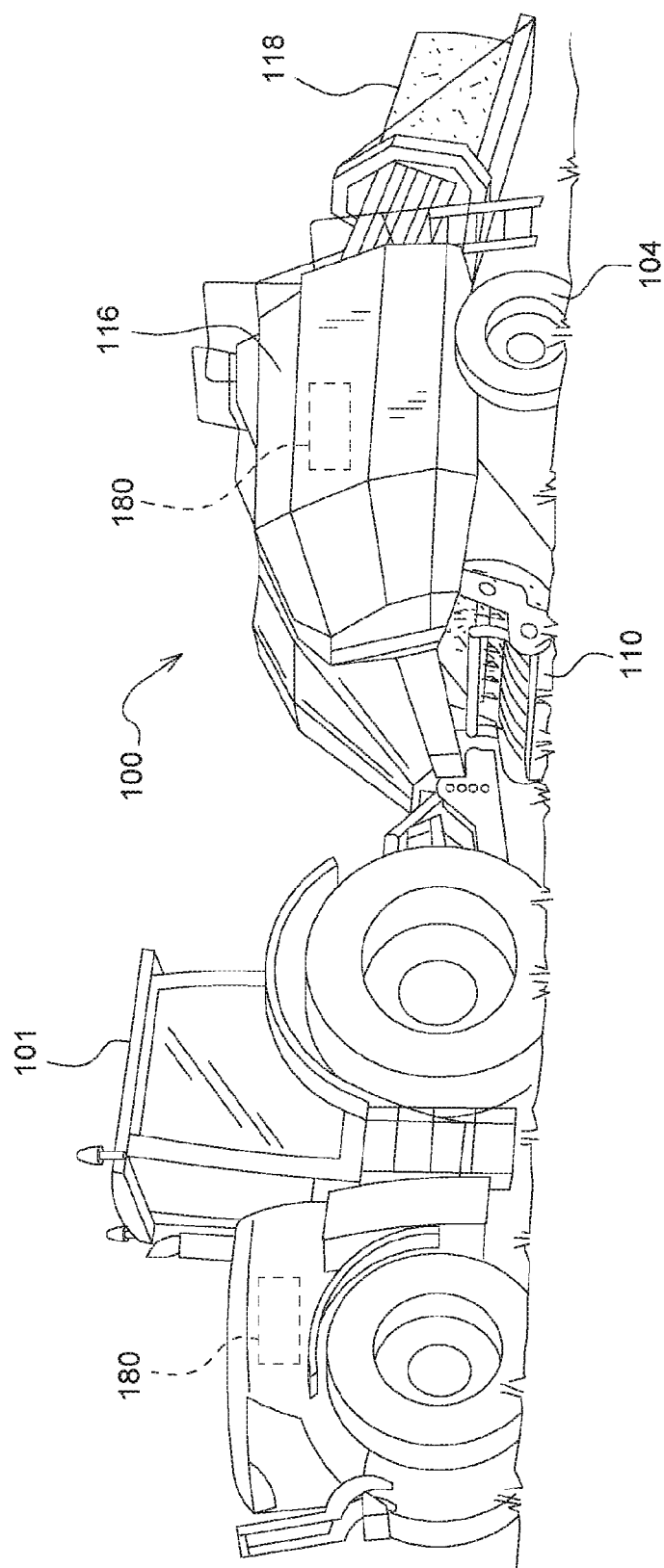
FIG. 1 is a perspective view of an agricultural harvesting machine couple to an agricultural vehicle.

FIG. 1 illustrates an agricultural harvesting machine 100, such as a baler, according to one exemplary embodiment. Although a large square baler is shown, this disclosure also applies to other balers and harvesting machines. An agricultural vehicle 101, such as a tractor, can be coupled to the agricultural harvesting machine 100 or the agricultural harvesting machine 100 can be self-propelled. The agricultural harvesting machine 100 can be combined or integrated with a cotton harvester, a combine, or other harvesting machines. The agricultural harvesting machine 100 and the agricultural vehicle 101 can each include an electronic control unit 180, or controller, having one or more microprocessor-based electronic control units or controllers, which perform calculations and comparisons and execute instructions. The controller 180 may include a processor, a core, volatile and non-volatile memory, digital and analog inputs, and digital and analog outputs. For ease of reference, the remaining description will refer to the agricultural harvesting machine 100 as a baler. As depicted in FIG. 1, the baler 100 may move across a field and gather and process crop material to form a crop package 118, such as a bale. The baler 100 may then eject the bale 118 from the rear of the baler 100.

Figure 2:
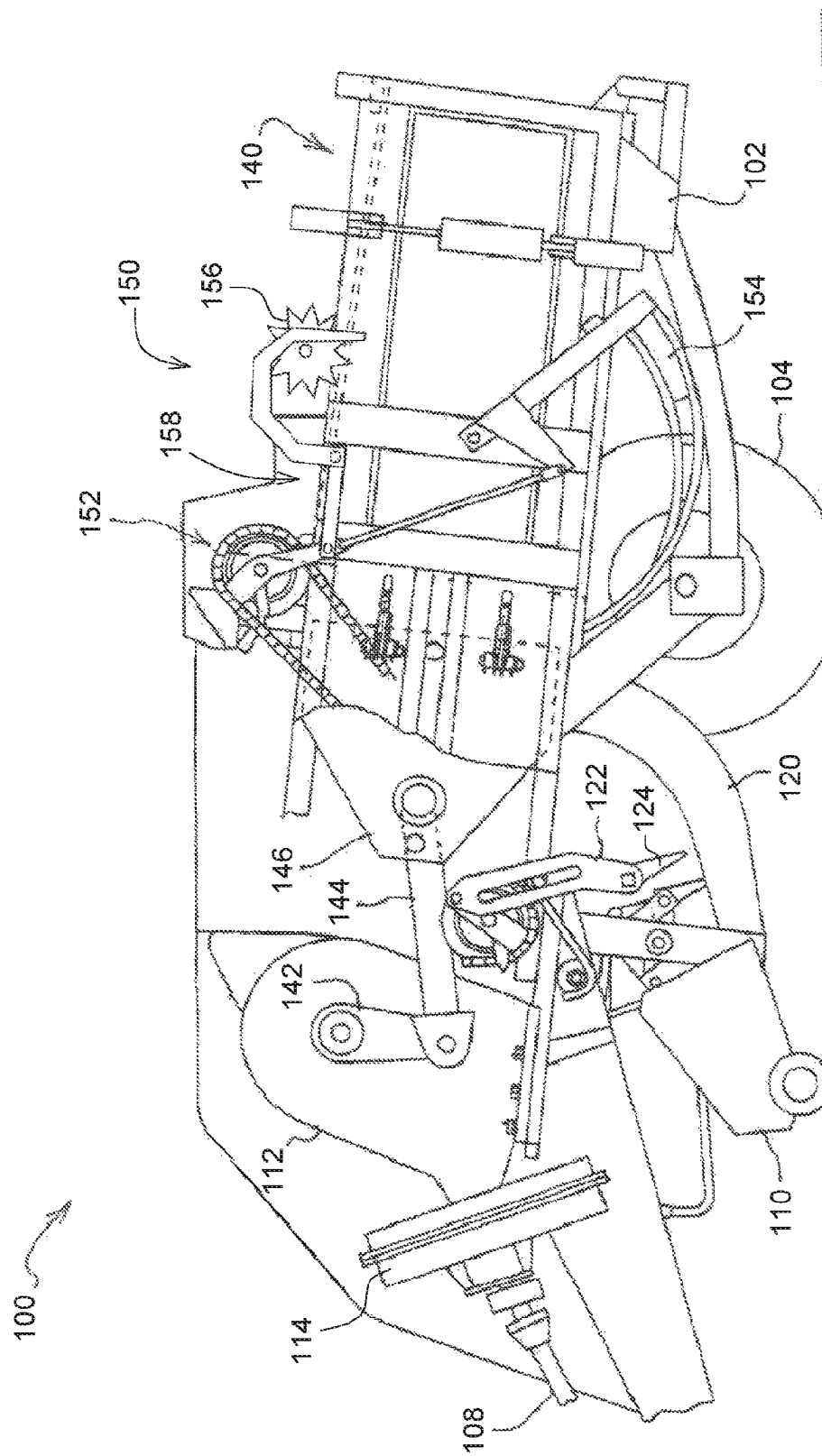
FIG. 2 is a schematic side view of the agricultural harvesting machine of FIG. 1.

As shown in FIG. 2, the baler 100 can include a frame 102, ground engaging devices 104, such as wheels, a hitch 106 for attachment to a tractor or other vehicle, and an input shaft 108, such as a power-take-off (PTO) shaft, which can receive rotational power from a tractor 101, other vehicle agricultural vehicles, or other power sources. The baler 100 can include a pick-up mechanism 110 which gathers crop material from the ground surface and feeds it into the baler 100. The pick-up mechanism no can include various pick-up apparatus in including, but not limited to, tines, forks, augers, conveyors, baffles, a cutter or pre-cutter assembly, or any combination of the preceding. The baler 100 includes a housing 116, which generally shields various internal components of the baler 100. The input shaft or PTO shaft 108 can connect to an input of the gear train or transmission 112 providing rotational power to the baler 100 from the tractor 101 or other associated vehicle or power source. The transmission 112 can include a gearbox which converts the rotational motion of the input shaft 108 along a generally longitudinal axis of the baler 100 to a rotational motion along a generally transverse axis of the baler 100. A flywheel 114 can connect to the input shaft 108, the transmission 112, or both. The flywheel 114 can be positioned between the transmission 112 and the input shaft 108, as shown.

The baler 100 can include a pre-compression chamber 120 which receives crop material from the pick-up mechanism no and accumulates the crop material until a pre-determined fill condition. A loading mechanism 122, or stuffer, moves crop material into the pre-compression chamber 120. The loading mechanism 122 can include projections 124, such as tines or forks, which are inserted or extended into the pre-compression chamber 120, at or near the entrance, to move crop material into and through the pre-compression chamber 120. The projections 124 can then be removed or retracted from the pre-compression chamber 120, at or near the exit, and repositioned at or near the entrance of the pre-compression chamber 120.

The baler 100 can include a crank arm 142 connected to the rotational output of the transmission 112. A connecting link 144 can be connected between the crank arm 142 and a plunger 146. The connecting link 144 can include one or more members connecting the crank arm 142 to the plunger 146. The crank arm 142 rotates based upon the output of the transmission 112 and the plunger 146 moves in a reciprocal motion as the crank arm 142 rotates. The plunger 146 extends into the compression chamber 140 compressing the crop material and then at least partially retracts from the compression chamber 140 to allow more crop material to enter the compression chamber 140.

With reference to FIGS. 2-6, the baler 100 can include a binding or knotter system 150 which binds the compressed crop material in the compression chamber 140 into a crop package, such as a bundle or bale. The binding system 150 can include one or more binding or knotter mechanisms 152 and one or more corresponding delivery devices or needles 154, which can deliver binding material to the binding mechanisms 152. The binding system 150 wraps and secures a binding material around the compressed crop material, or crop package, during a binding operation. The baler 100 can include a measuring device 156, such as a star wheel, which measures the length of the compressed crop material within the compression chamber 140. The measuring device 156 activates the binding system 150 when the compressed crop material within the compression chamber 140 reaches a desired mass, size, or length. The measuring device 156 can activate the binding mechanisms 152 via a mechanical trip assembly 158.

When the binding system is activated, the one or more binding material needles 154 each move from a lowered position generally below or underneath the baler 100, shown for example in FIG. 4, to a raised position, as shown for example in FIG. 6. The binding material needles 154 pass through a slot 139 in the bottom of the compression chamber 140, a vertically extending slot 149 in the plunger 146, and a slot 141 in the top in of the compression chamber 140. The one or more needles 154 can deliver binding material, such as string or twine, to the binding assembly 152, which secures the binding material around the compressed crop material within the compression chamber 140.

Figure 3:
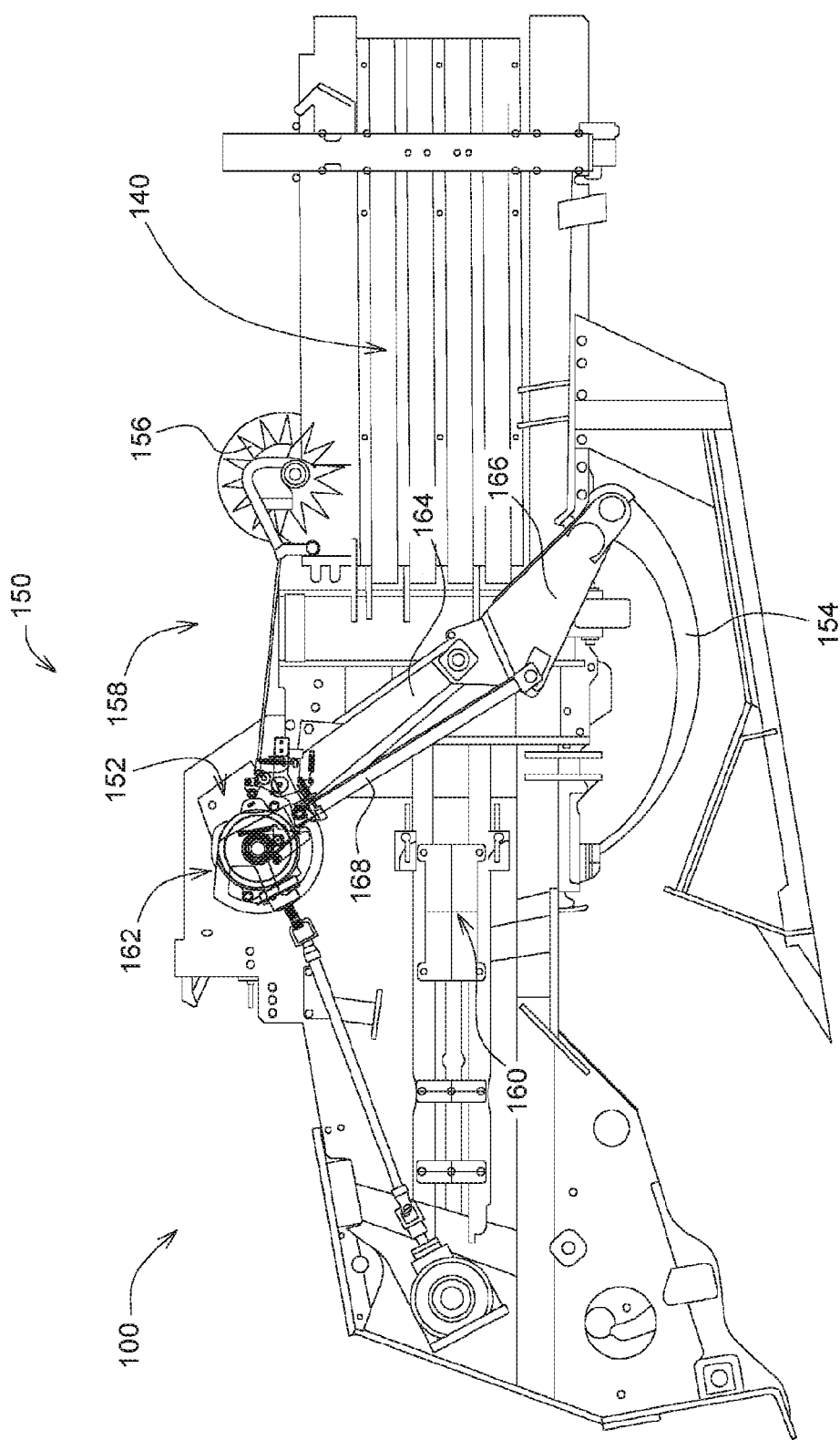
FIG. 3 is a side view of a portion of the agricultural harvesting machine of FIG. 1.

The binding system 150 can include a delivery mechanism 160 for moving the needles 154 from the lowered position to the raised position, as shown for example in FIG. 3. The delivery mechanism 160 can include a pivoting lift arm 162 and a support member 164 which pivotally supports a delivery or needle frame 166. One or more needles 154 can be coupled to the needle frame 166. The needle frame 166 is coupled to the lift arm 162 by a lift link 168. When the pivoting lift arm 162 rotates, the lift link assembly 172 raises the needle frame 166 and the coupled needles 154 from the lowered position, as shown in FIG. 4, through an intermediate position, as shown in FIG. 5, to the raised position, as shown in FIG. 6.

Figure 4:
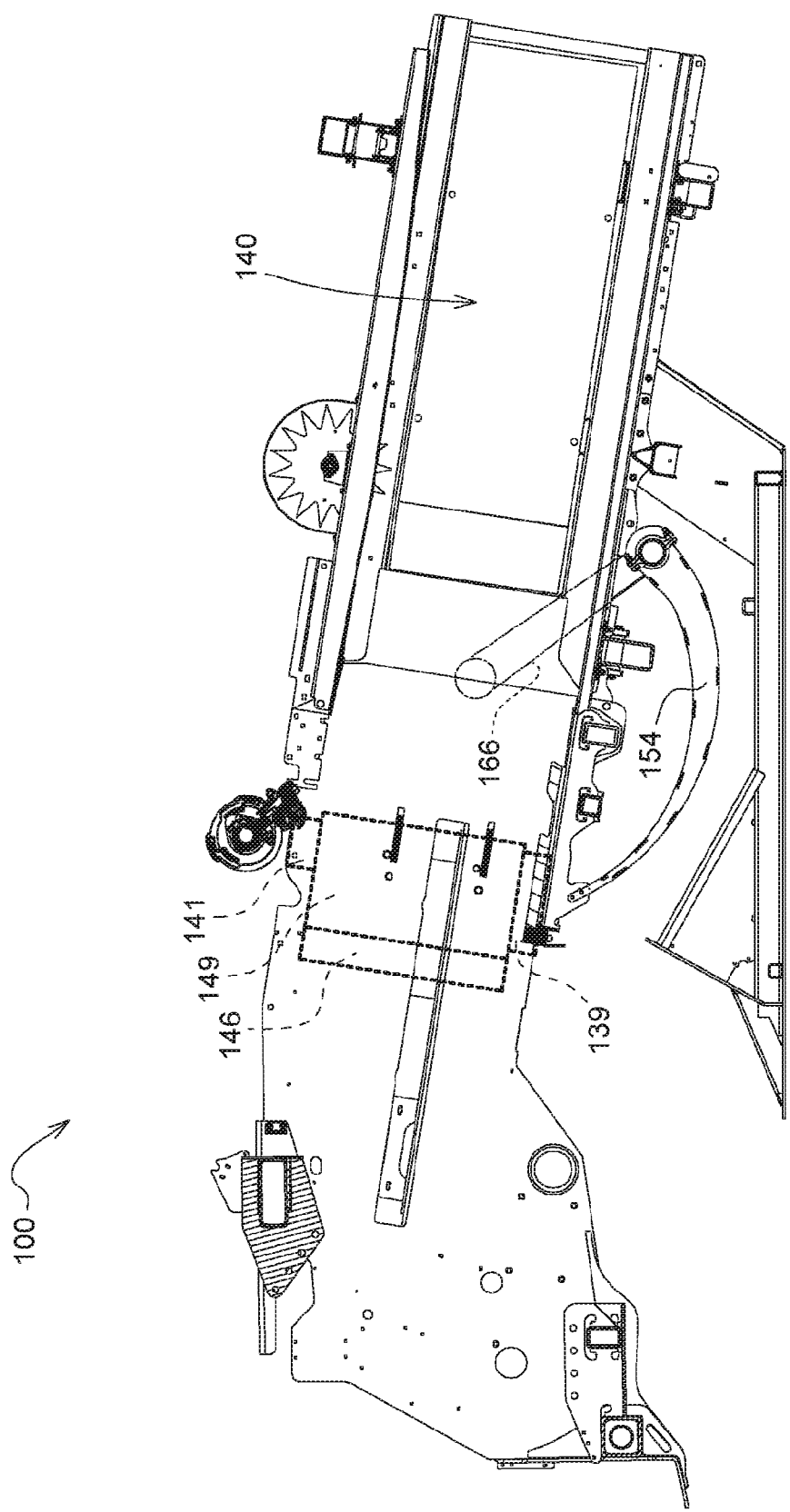
FIG. 4 is another side view of a portion of the agricultural harvesting machine of FIG. 1.
Figure 5:
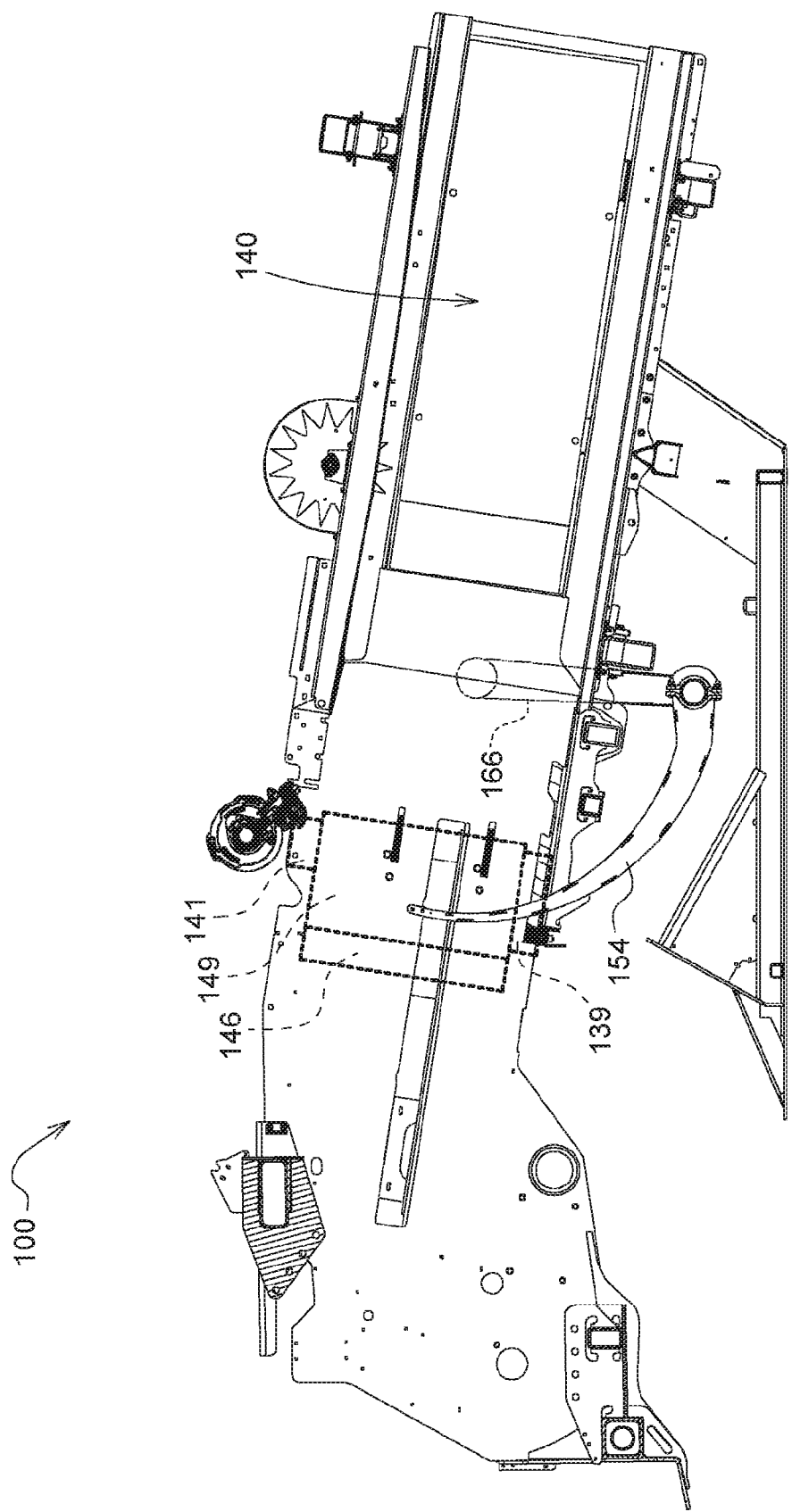
FIG. 5 is another side view of a portion of the agricultural harvesting machine of FIG. 1.
Figure 6:
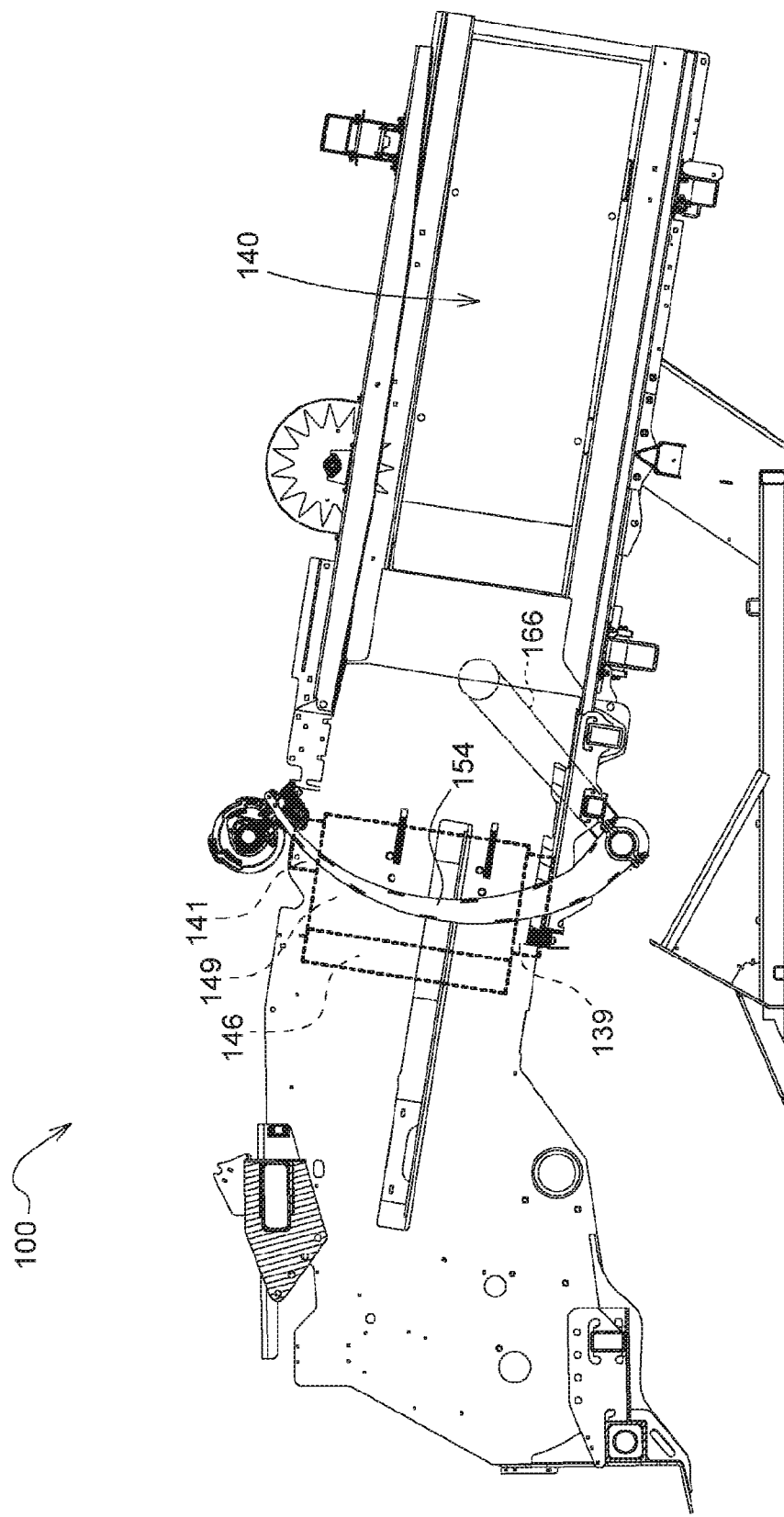
FIG. 6 is another side view of a portion of the agricultural harvesting machine of FIG. 1.

With reference to FIGS. 4-6, the delivery device 154 wraps binding material around at least a portion of the compressed crop or crop package and provides the binding material to the binding mechanism 152. The delivery device 154 remains in the lowered position as the crop material in the compression chamber 140 accumulates to pre-determined quantity, size, or amount. The binding system 150 activates and the delivery device 154 moves from the lowered position up through a slot 139 in the bottom of the compression chamber 140. The delivery device 154 continues to move upward through the compression chamber 140 in front of the crop material in the compression chamber 140. The delivery device 154 moves through a slot 149 located in a compression surface 147 of the plunger 146, which can be in contact with the crop material in the compression chamber 140. The delivery device 154 continues to move upward through the compression chamber 140 and through the slot 141 in the top of the compression chamber 140 to the binding mechanism 152. The delivery device 154 delivers the binding material to the binding mechanisms 152, which secures the binding material around the compressed crop material within the compression chamber 140. The delivery device 154 then begins moving downward out of the slot 141 in the top of the compression chamber 140 and back through the compression chamber 140. The delivery device 154 moves downward out of slot 139 in the bottom of the compression chamber 140 and back to the lowered position.

Figure 7:
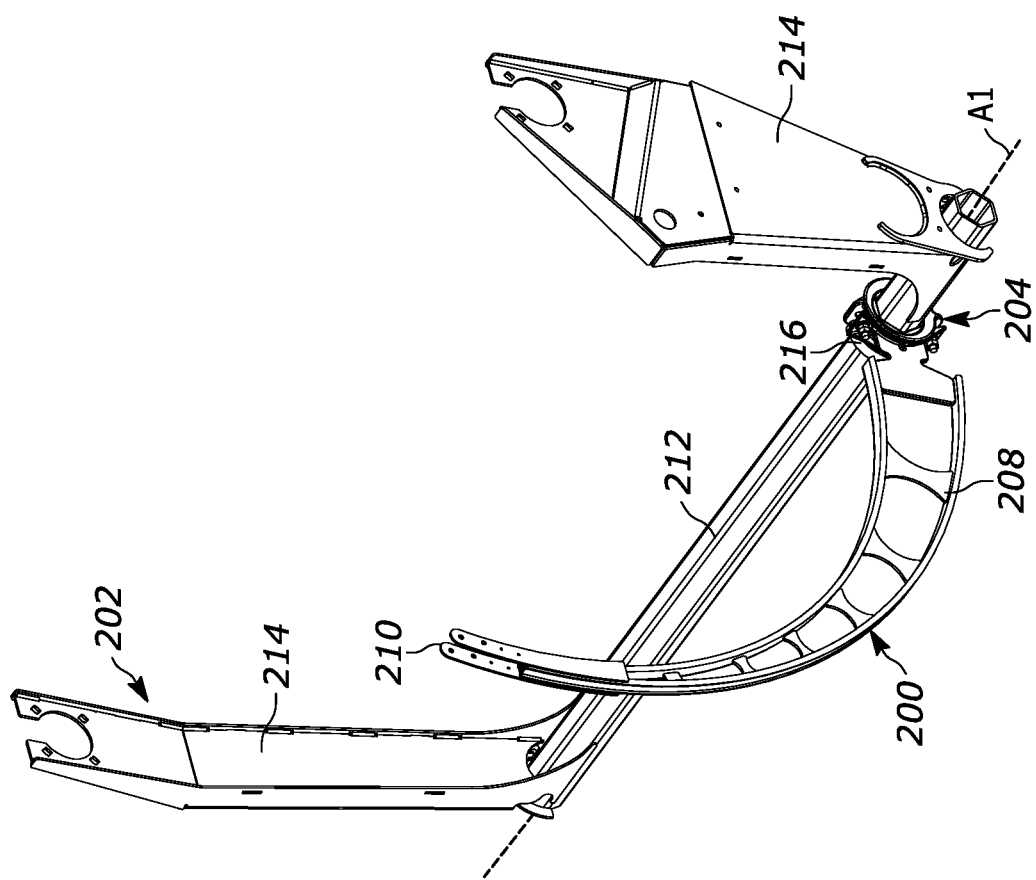
FIG. 7 is a perspective view of a needle connected to a needle frame by a needle coupling.

FIG. 7 shows an example of a needle 200 connected to a needle frame assembly 202 by a needle coupling 204. The needle 200 includes a footing 206 connected to the needle coupling 204 and a shaft 208 connected to and extending from the footing 206. The shaft 208 of the needle extends to a needle tip 210. The needle frame assembly 202 includes a yoke 212 connected to one or more yoke arms 214. The yoke 212 is depicted as being a hexagonal tube, but can have other configurations depending on strength requirements. The yoke 212 extends along a longitudinal axis A1. The needle coupling 204 is positioned on the yoke 212 and secured to set the lateral position of the needle 200 relative to the yoke 212. The connection between the needle 200 and the needle coupling 204 can be adjustable to modify the height of the needle, i.e., the position of the needle tip 210 relative to the yoke 212.

Figure 8:
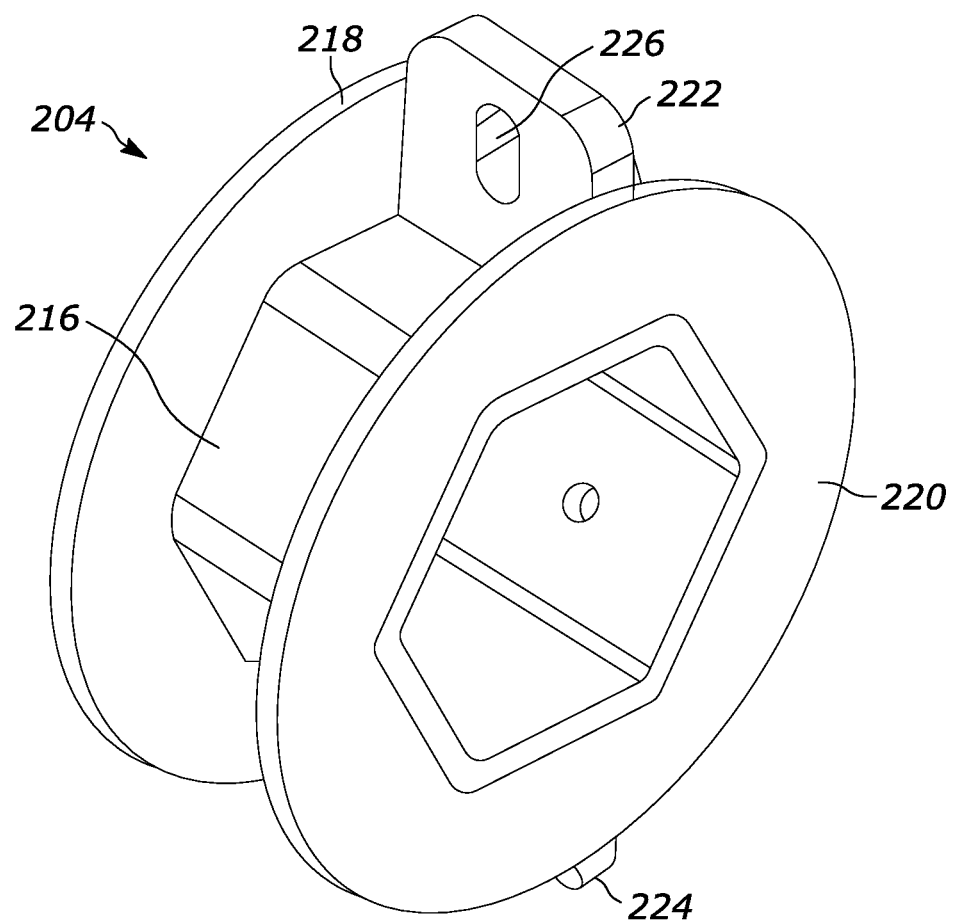
FIG. 8 is a perspective view of the needle coupling of FIG. 7.

As best shown in FIG. 8, the needle coupling 204 includes a base 216 that mates with the yoke 212. For example, the base 216 can be hexagonal tube with an inner surface configured to mate with an outer surface of the yoke 212. A first rim 218 and a second rim 220 extend from the base 216 and circumferentially around the base 126. An upper flange 222 and a lower flange 224 also extend from the base 216, spanning between the first rim 218 and the second rim 220. The upper and lower flange 222, 224 can each include an opening 226 that is configured to receive a fastener, such as a bolt.

The base 216 connects to the yoke and is configured to removably connect to the needle 200. The base 216 can be held in position relative to the yoke 212 by one or more fasteners that extend through the base 216 and engage the yoke 212. The fasteners can engage the outer surface of the yoke 212 or extend through a wall of the yoke 2121 and into the hollow interior. In one embodiment, the fasteners are self-tapping screws that can be driven through the yoke 212.

Figure 9:
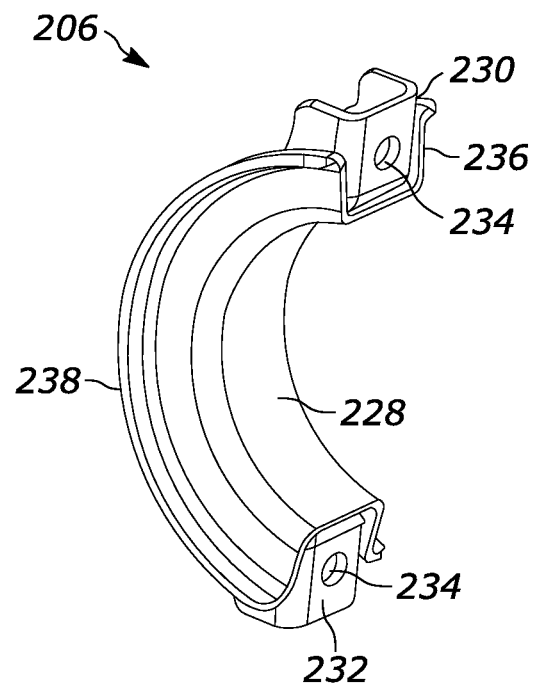
FIG. 9 is a rear perspective view of the needle footing of FIG. 7.
Figure 10:
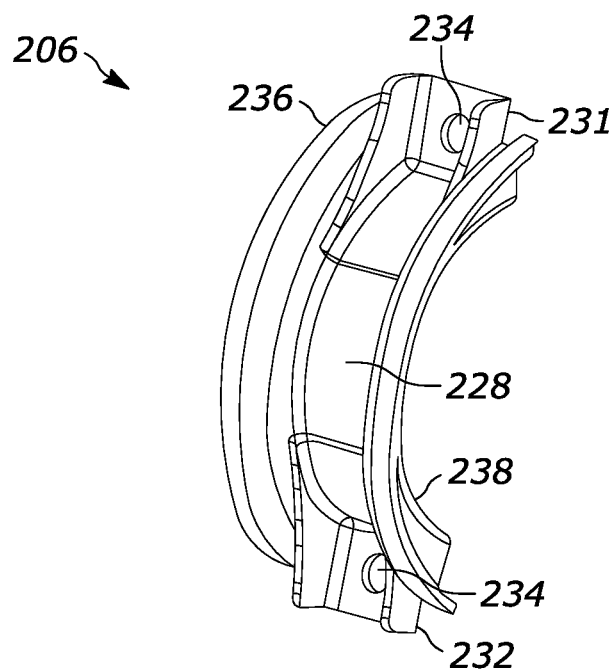
FIG. 10 is a front perspective view of the needle footing of FIG. 7.

As best shown in FIGS. 9 and 10, the needle footing 206 is configured to adjustably mate with the needle coupling 204. For example, the footing 206 includes a curved wall 228 extending between an upper flange 230 and a lower flange 232. The upper flange 230 and the lower flange 232 each include an opening 234 for receiving a fastener. A first rim 236 and a second rim 238 extend from the curved wall 228.

Figure 11:
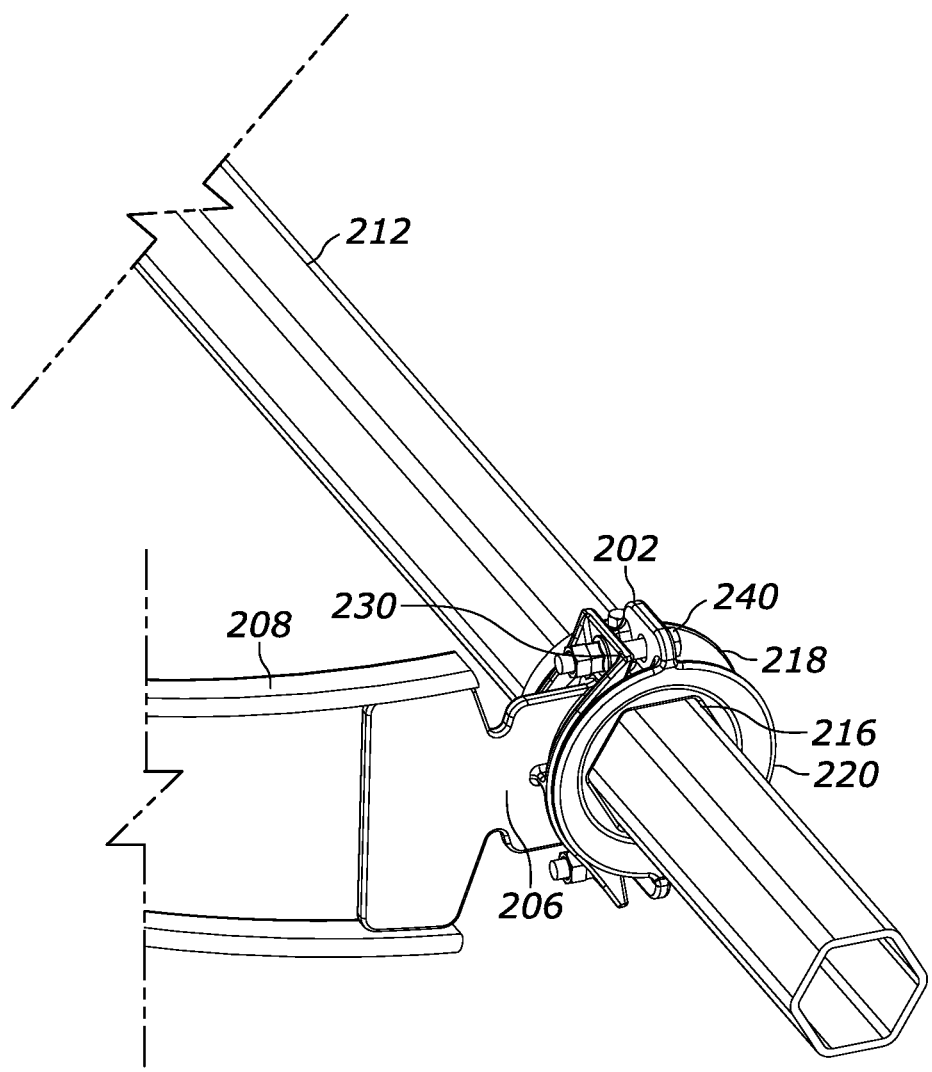
FIG. 11 is a perspective, enlarged view of the needle, needle coupling, and yoke of FIG. 7.

As shown in FIG. 11, needle fasteners 240 (e.g., bolts) extend through the upper and lower flanges 230, 232 on the needle footing 206 and into the upper and lower flanges 222, 224 on the base 216 to connect the needle 200 to the needle coupling 204. In order to adjust the position of the needle tip 210, the needle fasteners 240 can be tightened or loosened to raise or lower the position of the needle tip 210 with respect to the yoke 212. For example loosening the lower needle fastener 240 and tightening the upper needle fastener 240 will cause rotation of the footing 206 relative to the base 216 to raise the needle tip 210. In some embodiments, the structure of the base flanges 222, 224 or the footing flanges 230, 232 can be modified from what is shown to provide a captured feature for the needle fasteners 240. For example, recessed openings can be made which surround and capture the head of the bolts (e.g., cylindrical, hex, star, etc.) to prevent the bolts from rotating as a nut is tightened.

Figure 12:
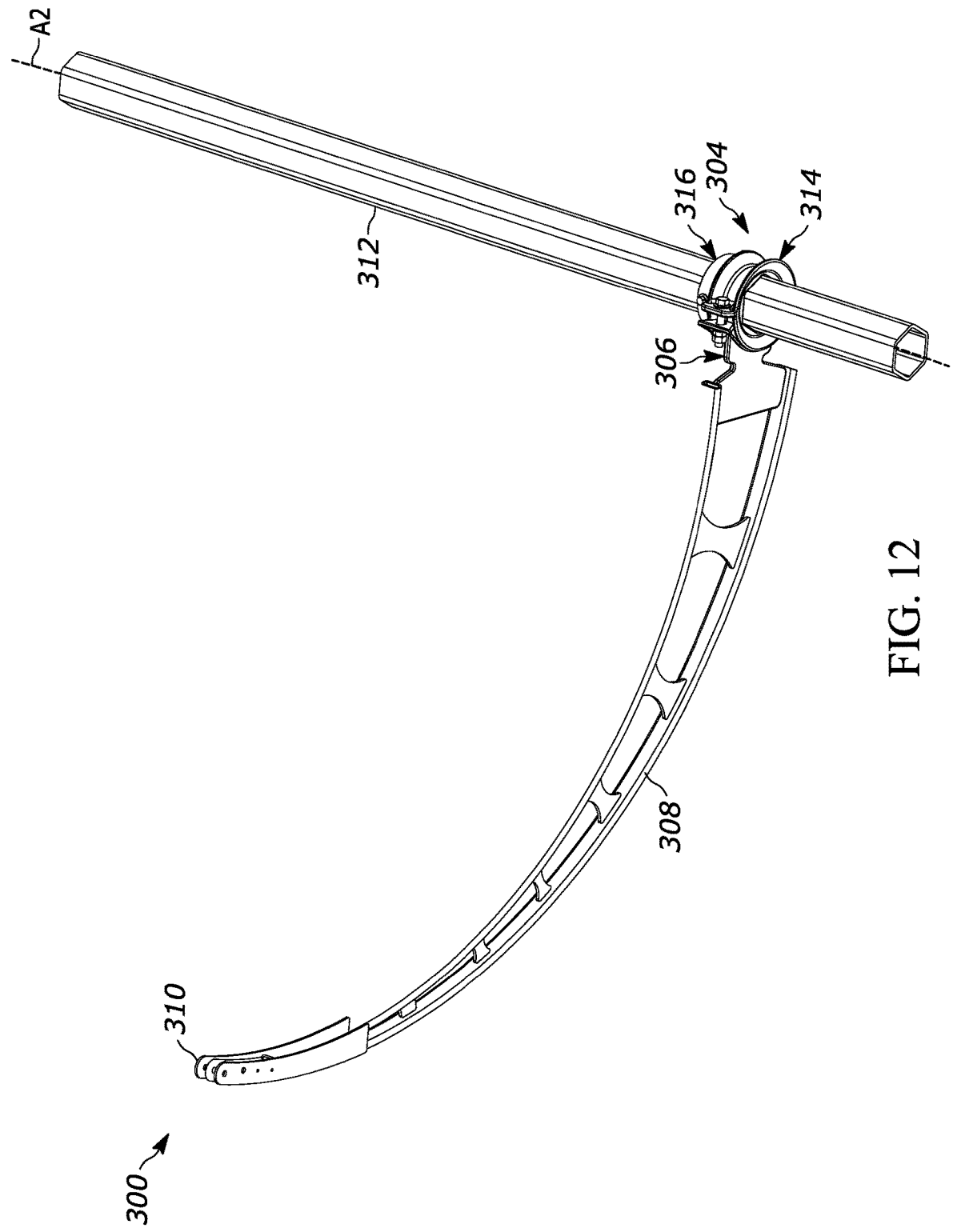
FIG. 12 is a perspective view of a needle connected to a yoke by a needle coupling.

FIG. 12 shows another example of a needle 300 connected to a yoke 312 of a needle frame assembly by a needle coupling 304. The needle 300 includes a footing 306 connected to the needle coupling 304 and a shaft 308 connected to and extending from the footing 306. The shaft 308 of the needle 300 extends to a needle tip 310. The yoke 312 is depicted as being a hexagonal tube, but can have other configurations depending on strength requirements. The yoke 312 extends along a longitudinal axis A2. The needle coupling 304 is positioned on the yoke 312 and secured to set the lateral position of the needle 300 relative to the yoke 312. The connection between the needle 300 and the needle coupling 304 can be adjustable to modify the height of the needle 300, i.e., the position of the needle tip 310 relative to the yoke 312.

Figure 13:
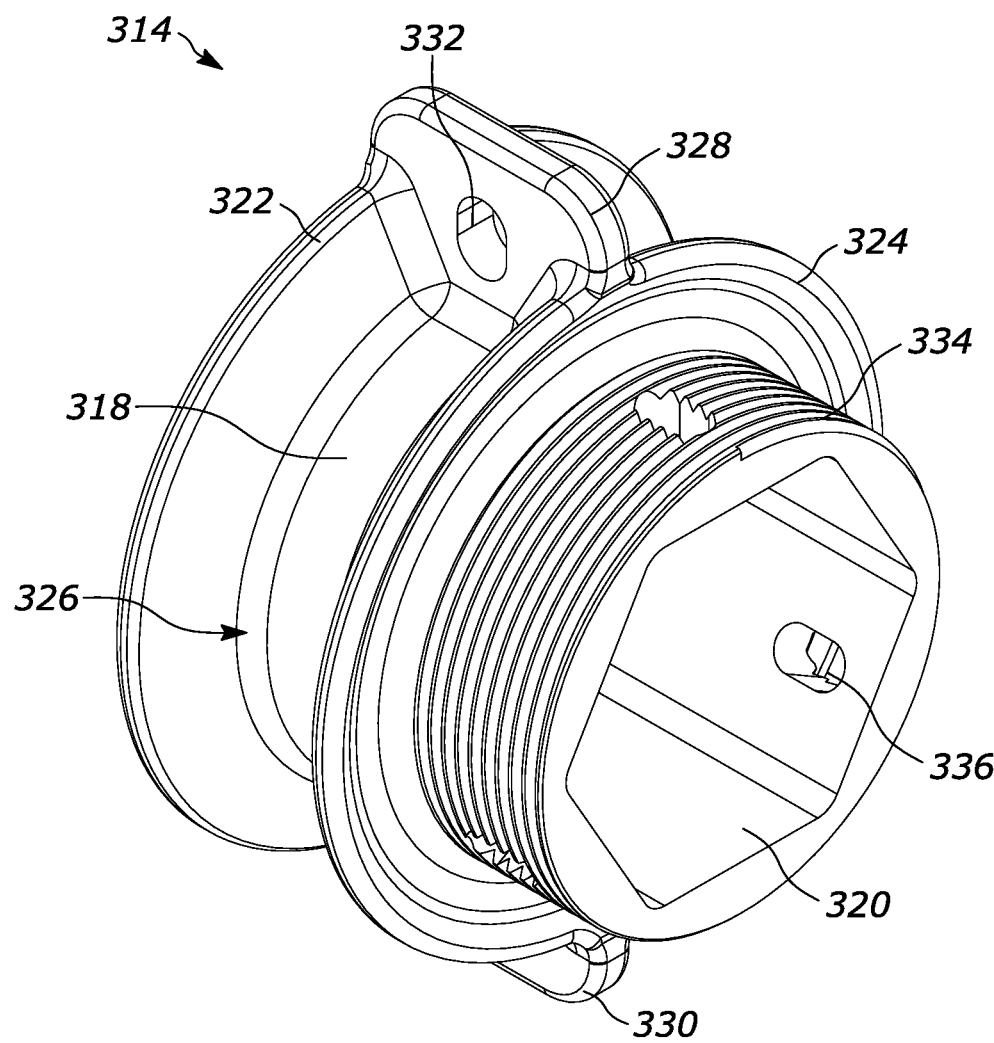
FIG. 13 is a perspective view of a needle coupling base of FIG. 7.
Figure 14:
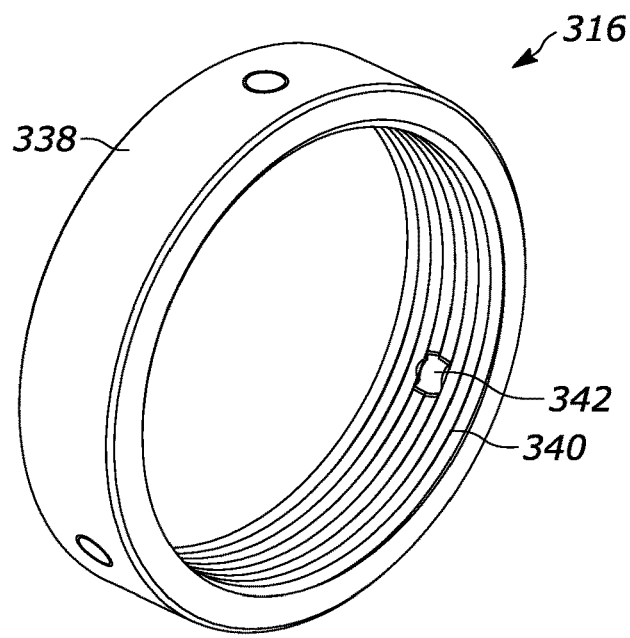
FIG. 14 is a perspective view of a needle coupling collar of FIG. 7.

FIGS. 13 and 14 show an example of the needle coupling 304 that includes a base 314 and a collar 316 connected to the base 304. As best shown in FIG. 8, the base 314 includes an outer portion 318 and an inner portion 320. As shown in the illustrated embodiment, the outer portion 318 can have a cylindrical configuration and the inner portion 320 has a configuration that mates with the yoke (in this example a hexagonal configuration). A first rim 322 and a second rim 324 extend from the base 314 circumferentially around the outer portion 318. In the illustrated embodiment, the first rim 322 and the second rim 324 each extend at an oblique angle and taper outwardly from the outer portion 318 to form a tapered groove 326. An upper flange 328 and a lower flange 330 also extend from the outer portion 318, spanning between the first rim 322 and the second rim 324. The upper and lower flange 328, 330 can each include an opening 332 that is configured to receive a fastener, such as a bolt.

The base 314 also includes a threaded portion 334 that extends from one side of the first or second rim. The threaded portion 334 has an outer thread that is configured to threadably engage the collar 316. One or more first openings 336 extend through the threaded portion 334 in a direction non-parallel to the longitudinal axis A2 of the yoke 312, for example perpendicular to the longitudinal axis A2 of the yoke 312.

As best shown in FIG. 14, the collar 316 has a cylindrical configuration with an outer portion 338 and an inner thread 340 that mates with the treaded portion 334. One or more second openings 342 extend through the collar 316 in a directed non-parallel to the longitudinal axis A2 of the yoke 312, for example perpendicular to the longitudinal axis A2 of the yoke 312. The second openings 342 are configured to align with the first set of openings 336. The first and second openings 336, 342 can also be threaded. In the illustrated embodiment, there are three of the first and second openings 336, 342.

Figure 15:
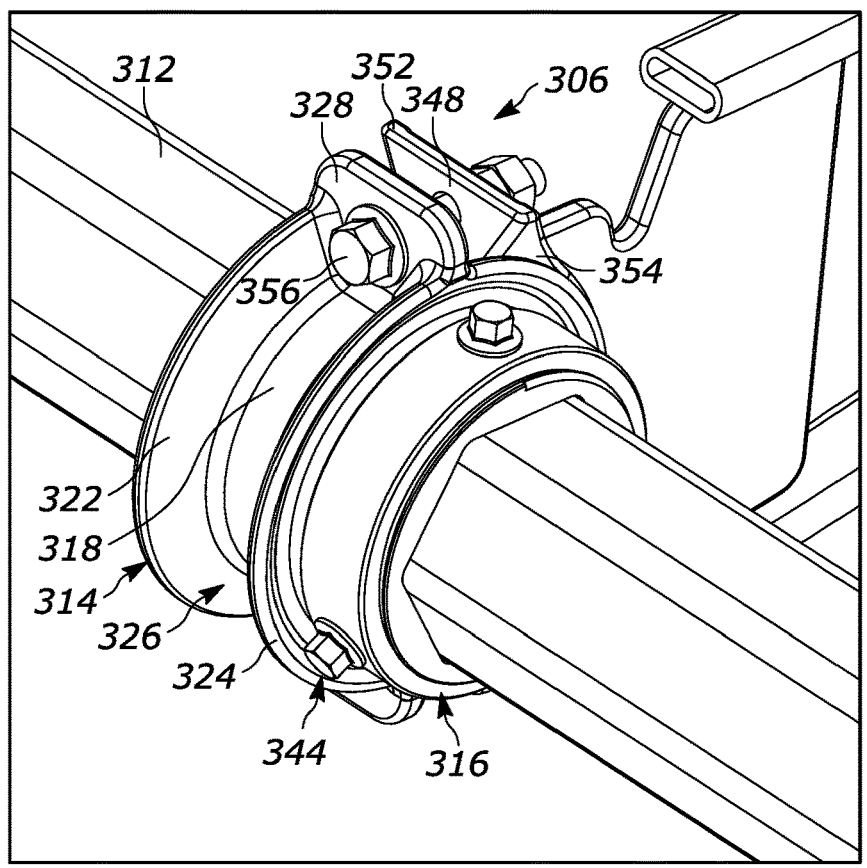
FIG. 15 is a perspective, enlarged view of the needle coupling connected to the yoke of FIG. 7.
Figure 16:
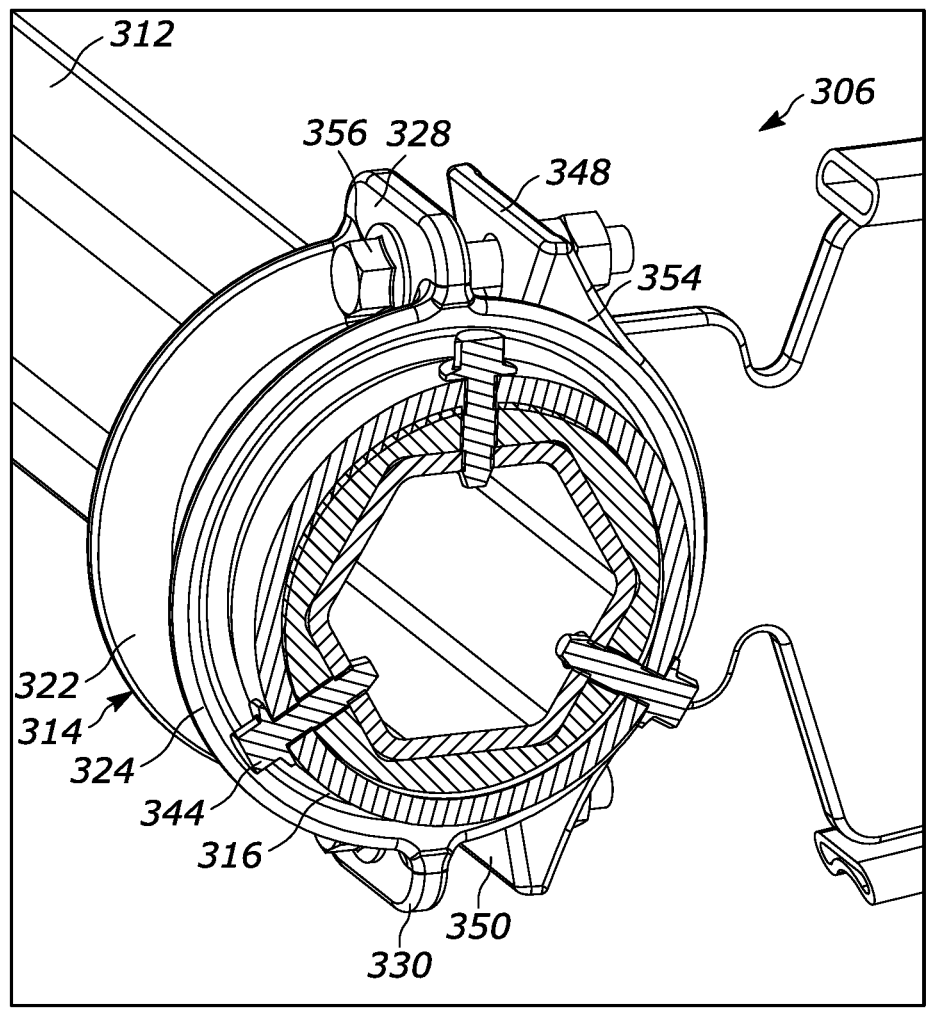
FIG. 16 is a sectional view of FIG. 10 perpendicular to the longitudinal axis of the yoke.
Figure 17:
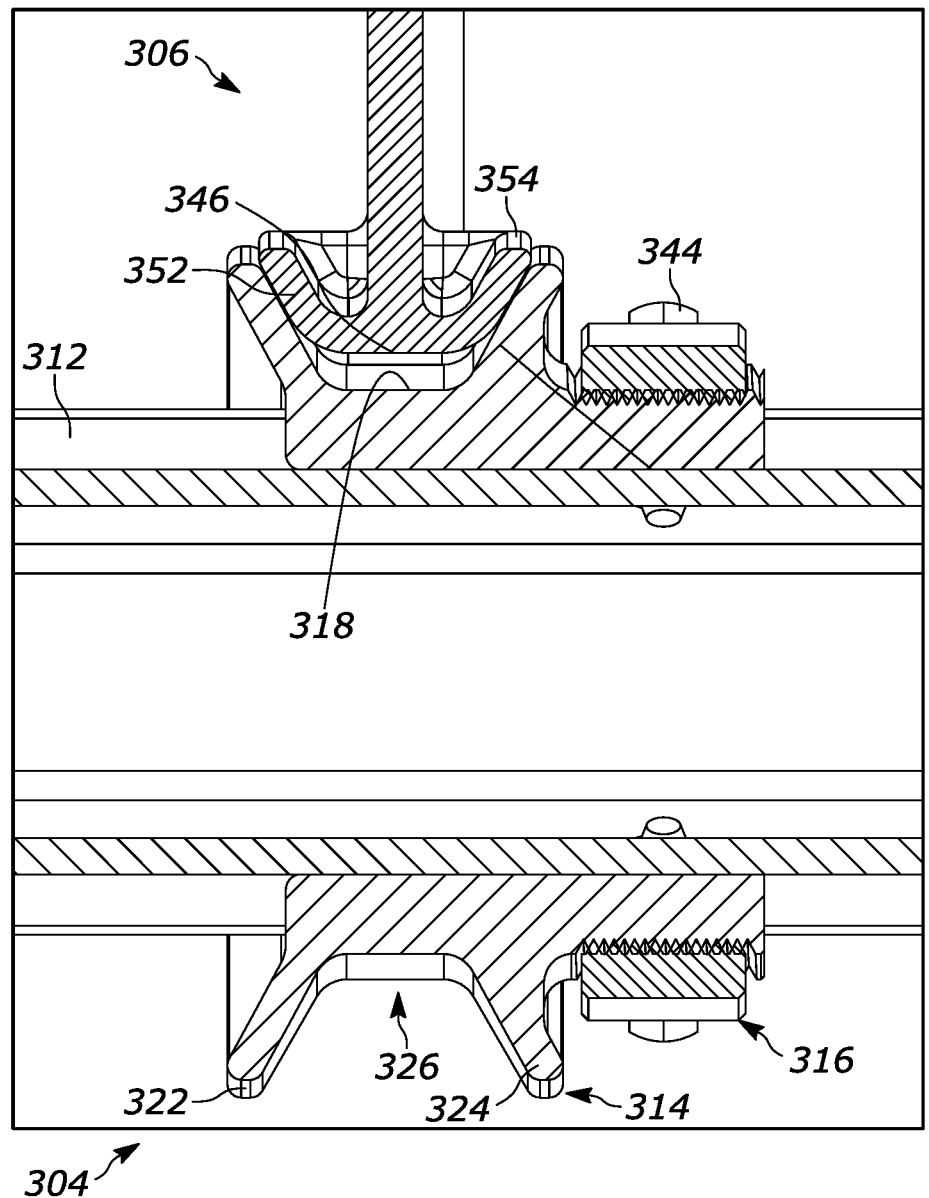
FIG. 17 is a sectional view of FIG. 10 parallel to the longitudinal axis of the yoke.
Figure 18:
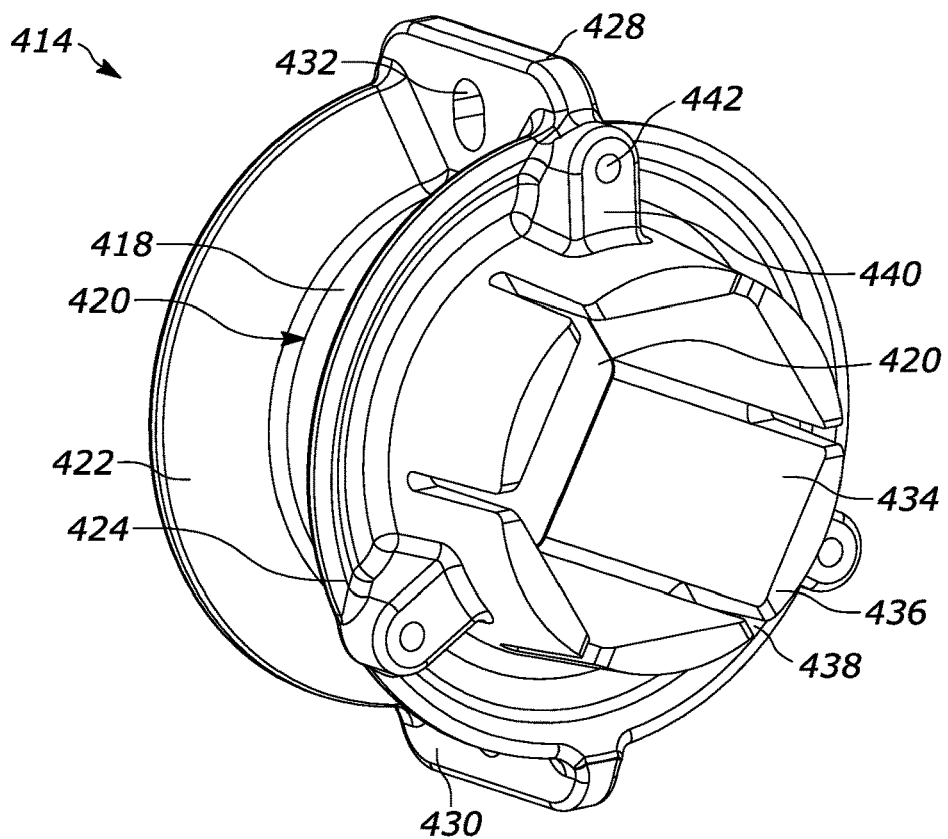
FIG. 18 is a perspective view of another needle coupling base.

The base 314 connects to the yoke 312 and is configured to removably connect to the needle 300. As best shown in FIGS. 15-17, the base 314 can be held in position relative to the yoke 312 by one or more yoke fasteners 344 that extend through the collar 316 and the base 314, and engage the yoke 312. The yoke fasteners 344 can engage the outer surface of the yoke 312 or extend through a wall of the yoke 312 and into the hollow interior. In one embodiment, the yoke fasteners 344 are self-tapping screws that can be driven through the yoke 312. The collar 316 can be made of a harder material than the base 314 and provide additional support for the connection between the needle coupling 304 and the yoke 312. In an exemplary embodiment, the base 314 is made from aluminum and the collar 316 is made from a material with a greater hardness, such as iron or steel.

The needle footing 306 is configured to adjustably mate with the needle coupling 304. For example, the footing 306 includes a curved wall 346 extending between an upper flange 348 and a lower flange 350. A first rim 352 and a second rim 354 extend from the curved wall 346 at an oblique angle and taper outwardly to mate with the tapered groove 326 of the base 314.

Needle fasteners 356 (e.g., bolts) extend through the upper and lower flanges 348, 350 on the needle footing 306 and into the upper and lower flanges 328, 330 on the base 314 to connect the needle 300 to the needle coupling 304. In order to adjust the position of the needle tip 310, the needle fasteners 356 can be tightened or loosened to raise or lower the position of the needle tip 310 with respect to the yoke 312. For example loosening the lower needle fastener 356 and tightening the upper needle fastener 356 will cause rotation of the footing 306 in the tapered groove 326 to raise the needle tip 310. In some embodiments, the structure of the base flanges 328, 330 or the footing flanges 348, 350 can be modified from what is shown to provide a captured feature for the needle fasteners 356. For example, recessed openings can be made which surround and capture the head of the bolts (e.g., cylindrical, hex, star, etc.) to prevent the bolts from rotating as a nut is tightened.

FIGS. 18-21 show another exemplary embodiment of a needle coupling 404 that includes a base 414 and a collar 416 connected to the base 414. The base 414 includes an outer portion 418 and an inner portion 420. As shown in the illustrated embodiment, the outer portion 418 can have a cylindrical configuration and the inner portion 420 has a configuration that mates with the yoke 312 (in this example a hexagonal configuration). A first rim 422 and a second rim 424 extend circumferentially from the outer portion 418. In the illustrated embodiment, the first rim 422 and the second rim 424 each extend at an oblique angle and taper outwardly from the outer portion 418 to form a tapered groove 426. An upper flange 428 and a lower flange 430 also extend from the outer portion 418, spanning between the first rim 422 and the second rim 424. The upper and lower flange 428, 430 can each include an opening 432 that is configured to receive a fastener, such as a bolt.

Figure 19:
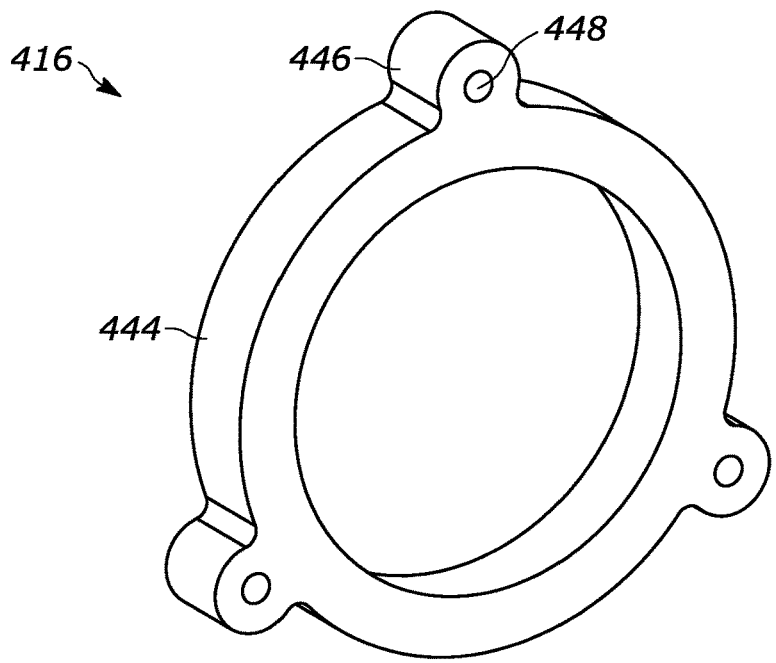
FIG. 19 is a perspective view of another needle coupling collar.
Figure 21:
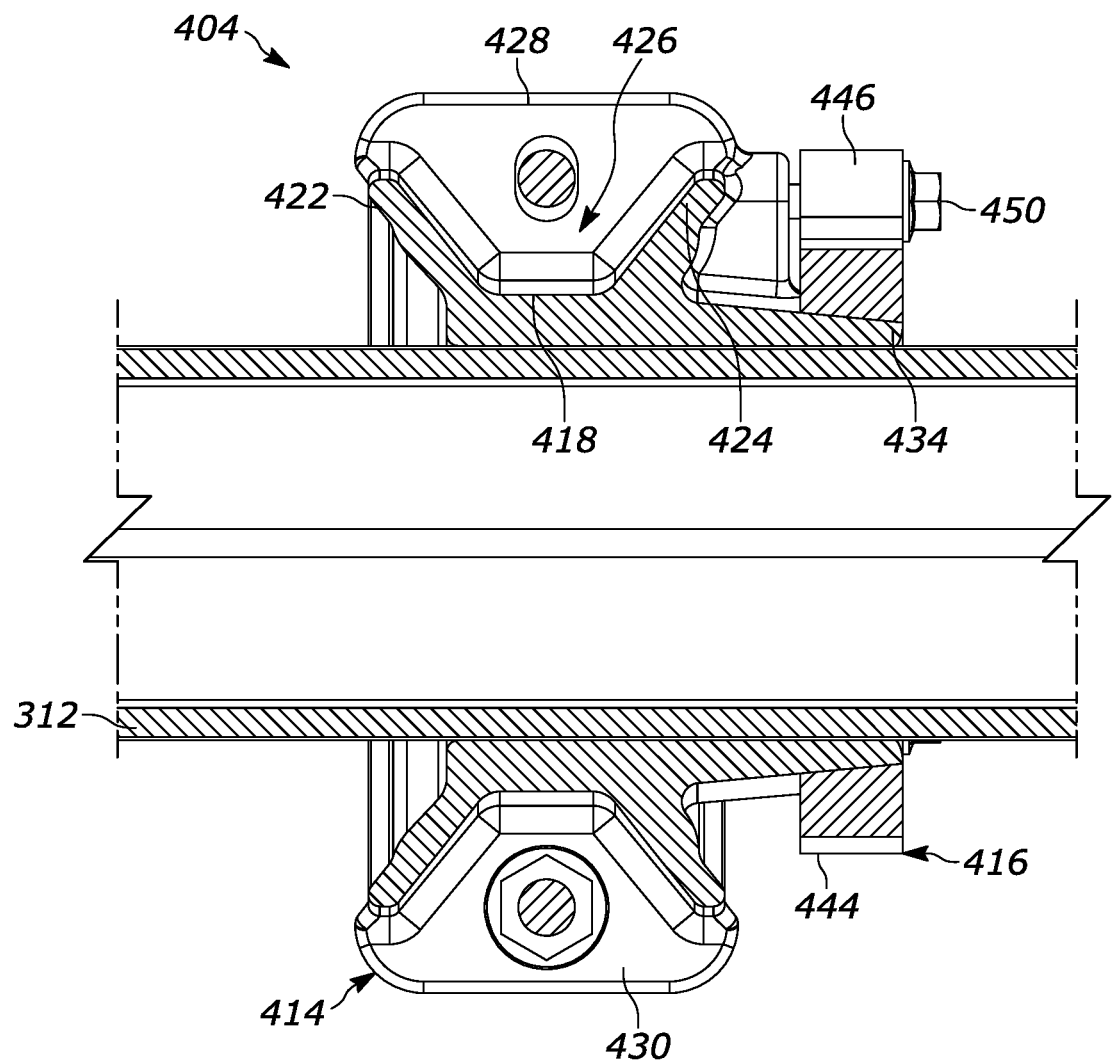
FIG. 21 is a sectional view of FIG. 15 parallel to the longitudinal axis of the yoke.

The base 414 also includes a series of tongues 434 that extend away from the first and second rim 422, 426 to a free end 436. Slots 438 are provided between the tongues 434. As best shown in FIG. 21, the tongues 434 taper toward the free end 436. One or more first protrusions 440 extend above one or more of the tongues 434. A first opening 442 extends through the first protrusion 440 in a direction non-perpendicular to the longitudinal axis A2 of the yoke 312, for example parallel to the longitudinal axis A2 of the yoke 412. As best shown in FIG. 19, the collar 416 has a cylindrical portion 444 and one or more second protrusions 446 extending outwardly from the cylindrical portion 44. The cylindrical portion 44 includes an inner diameter that can be tapered corresponding to the taper of the tongues 434 as shown in FIG. 21. The second protrusions 446 align with the first protrusions 440. A second opening 448 extends through each of the second protrusions 446 in a direction non-perpendicular to the longitudinal axis A2 of the yoke 312, for example parallel to the longitudinal axis A2 of the yoke 312. The first and second protrusion openings 442, 448 can also be threaded. In the illustrated embodiment, there are three of the first and second protrusions 440, 446, although fewer or more first protrusions can be used.

Figure 20:
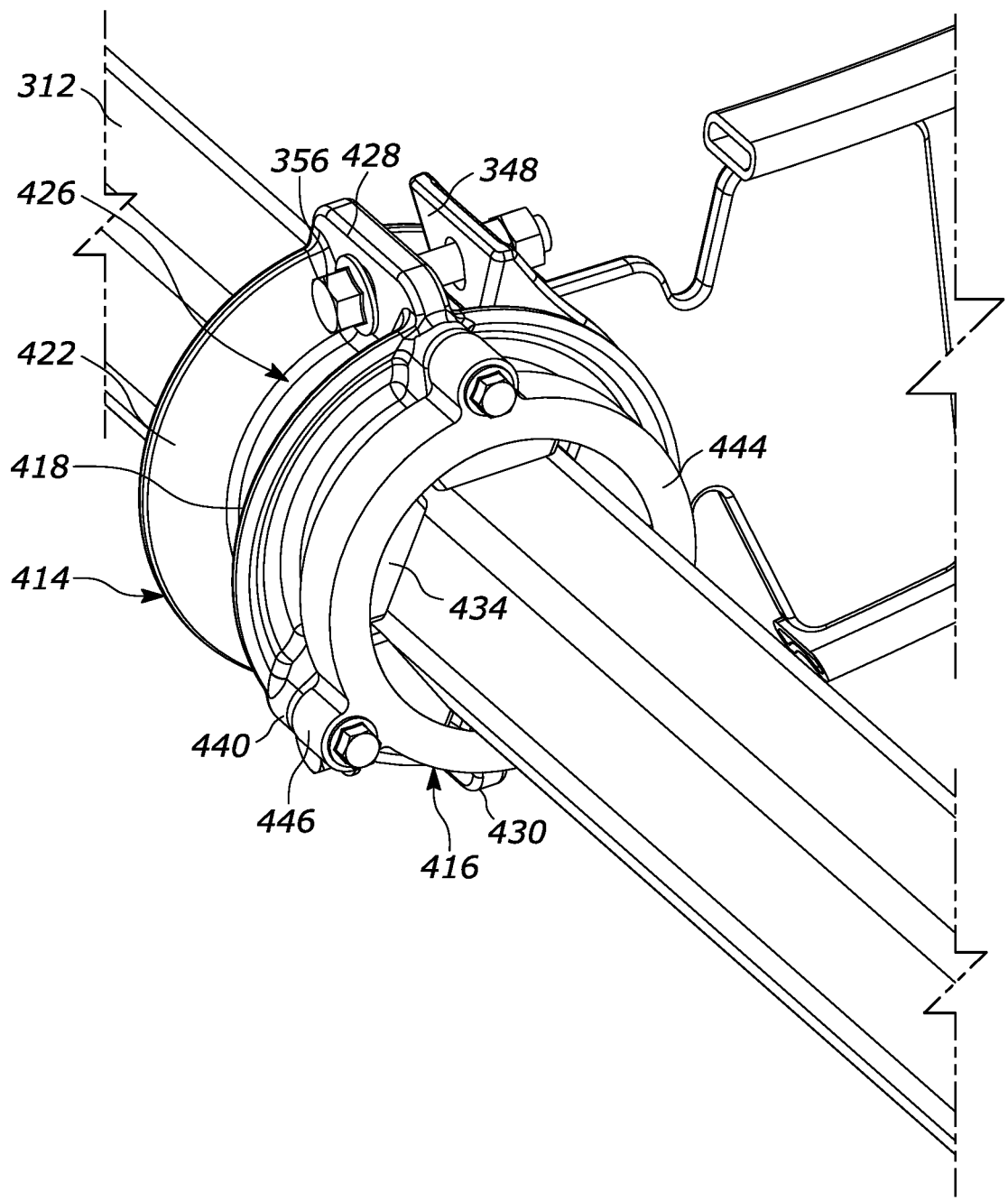
FIG. 20 is a perspective, enlarged view of the needle coupling of FIGS. 13 and 14 connected to a yoke.

The base 414 connects to the yoke 312 and is configured to removably connect to the needle 300. As best shown in FIGS. 20 and 21, the base 414 can be held in position relative to the yoke 312 by one or more coupling fasteners 450 that extend through the first and second protrusions 440, 446 to draw the collar 416 into engagement with the tongues 434. Because the tongues 434 are tapered with an increased thickness further from the free end 438 and the collar cylindrical portion 444 has a corresponding taper that widens toward the base 414, the further the collar 416 is engaged with the tongues 434, the greater the clamping force provided on the yoke 312 from the tongues 434. The collar 416 can be made of a harder material than the base 414 and provide additional support for the connection between the needle coupling 404 and the yoke 312. In an exemplary embodiment, the base 414 is made from aluminum and the collar 416 is made from a material with a greater hardness, such as iron or steel.

The needle footing 306 is configured to adjustably mate with the needle coupling 404 in the same manner as described above.

The yoke and needle couplings should exhibit sufficient strength, stiffness, and/or rigidity through the operating cycle so that the needles 214 maintain their relative position within the slots 139, 149, 141. Additionally, because of the rapid movement of the delivery device 154 during each cycle, the mass of the yoke and the needle coupling should be minimized to reduce the momentum of the delivery device 154 during its cycle to reduce stress on the various components and reduce cycle time. While yokes are typically made from a steel member having a cylindrical or rectangular cross-section and welded components, such steel yokes are heavy, which increases the momentum during a cycle, thereby increasing the stress on the components of the delivery device 154, as well as slowing the cycle time. Other lighter materials, such as aluminum, do not exhibit the material properties required to form the yoke using the traditional cross-sectional shapes in the same general dimensions previously utilized by steel yokes, i.e. square or cylindrical. The use of the hexagonal tube and/or the needle coupling, however, enables the yoke and the needle couplings to be manufactured from extruded aluminum, instead of steel, while maintaining the same generally exterior dimensions of traditional yokes. The yoke and the needle couplings described herein, when manufactured from aluminum, reduces weight while increasing the stiffness of the yoke relative to traditional steel yokes, allowing for greater structural integrity with a reduced momentum during movement.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An agricultural harvesting machine comprising:
   a binding mechanism configured to secure binding material around crop material formed into a crop package; and
   a delivery device configured to wrap binding material around a portion of the crop package and provide binding material to the binding mechanism,
   wherein the delivery device includes:
      a yoke extending along a longitudinal axis;
      a needle coupling connected to the yoke, the needle coupling including a base having an outer portion, a first upper flange, and a first lower flange; and
      a needle connected to the needle coupling, the needle including a tip and a footing, the footing having a curved wall extending between a second upper flange and a second lower flange;
      wherein the needle is connected to the needle coupling by a first fastener extending through the first upper flange and the second upper flange, a second fastener extending through the first lower flange and the second lower flange; and
      wherein adjustment of the first fastener and the second fastener adjusts the position of the tip relative to the yoke, and
      wherein the yoke includes a hexagonal tube and the base includes a hexagonal inner portion.

2. The agricultural harvesting machine of claim 1, wherein the needle coupling includes a first rim extending from the outer portion and a second rim extending from the outer portion opposite the first rim.

3. The agricultural harvesting machine of claim 1, wherein the needle coupling includes a collar connected to the base to secure the base to the yoke.

4. The agricultural harvesting machine of claim 2, wherein the first rim and the second rim extend circumferentially around the base.

5. An agricultural harvesting machine comprising:
   a binding mechanism configured to secure binding material around crop material formed into a crop package; and
   a delivery device configured to wrap binding material around a portion of the crop package and provide binding material to the binding mechanism,
   wherein the delivery device includes:
      a yoke extending along a longitudinal axis;
      a needle coupling connected to the yoke, the needle coupling including a base having an outer portion, a first rim extending at an oblique angle from the outer portion, a second rim extending at an oblique angle from the outer portion, a first upper flange, and a first lower flange, wherein the first and second rims at least partially define a tapered groove; and
      a needle connected to the needle coupling, the needle including a tip and a footing, the footing having a curved wall extending between a second upper flange and a second lower flange;
      wherein the needle is connected to the needle coupling by a first fastener extending through the first upper flange and the second upper flange, a second fastener extending through the first lower flange and the second lower flange, and the curved wall is positioned in the tapered groove.

6. The agricultural harvesting machine of claim 5, wherein adjustment of the first fastener and the second fastener adjusts the position of the tip relative to the yoke.

7. The agricultural harvesting machine of claim 5, wherein the yoke includes a hexagonal tube and the base includes a hexagonal inner portion.

8. The agricultural harvesting machine of claim 5, wherein the footing includes a third rim extending from the curved wall at an oblique angle and a fourth rim extending from the curved wall at an oblique angle, and wherein the third rim engages the first rim and the fourth rim engages the second rim.

9. The agricultural harvesting machine of claim 5, wherein the needle coupling includes a collar connected to the base to secure the base to the yoke and wherein the base includes a threaded portion having an outer thread and the collar includes an inner thread configured to mate with the outer thread.

10. The agricultural harvesting machine of claim 5, wherein the needle coupling includes a collar connected to the base to secure the base to the yoke and wherein the base includes a set of tongues and wherein engagement of the collar with the tongues secures the base to the yoke.

11. The agricultural harvesting machine of claim 10, wherein the base includes a first protrusion having a first opening and the collar includes a second protrusion having a second opening, and wherein a fastener extends through the first opening and the second opening to secure the collar to the base.

12. An agricultural harvesting machine comprising:
   a binding mechanism configured to secure binding material around crop material formed into a crop package; and
   a delivery device configured to wrap binding material around a portion of the crop package and provide binding material to the binding mechanism,
   wherein the delivery device includes:
      a yoke extending along a longitudinal axis;

a needle coupling connected to the yoke, the needle coupling including a base and a collar removably connected to the base; and a needle connected to the needle coupling, the needle including a tip and a footing;

wherein a connection between the collar and the base secures a position of the needle relative to the longitudinal axis of the yoke.

13. The agricultural harvesting machine of claim 12, wherein the base includes a first opening and the collar includes a second opening, and wherein a fastener extends through the first opening and the second opening to secure the collar to the base.

14. The agricultural harvesting machine of claim 13, wherein the first opening and the second opening extend parallel to the longitudinal axis of the yoke.

15. The agricultural harvesting machine of claim 13, wherein the first opening and the second opening extend perpendicular to the longitudinal axis of the yoke and the fastener extends into the yoke.

16. The agricultural harvesting machine of claim 12, wherein the base includes a threaded portion having an outer thread and the collar includes an inner thread configured to mate with the outer thread.

17. The agricultural harvesting machine of claim 12, wherein the base includes a set of tongues and wherein engagement of the collar with the tongues secures the base to the yoke.

18. The agricultural harvesting machine of claim 12, wherein the base includes a first protrusion having a first opening and the collar includes a second protrusion having a second opening, and wherein a fastener extends through the first opening and the second opening to secure the collar to the base.

19. The agricultural harvesting machine of claim 12, wherein the base has an outer portion, a first rim extending at an oblique angle from the outer portion, a second rim extending at an oblique angle from the outer portion, a first upper flange, and a first lower flange, wherein the first and second rims at least partially define a tapered groove.

20. The agricultural harvesting machine of claim 19, wherein the footing includes a curved wall extending between a second upper flange and a second lower flange and wherein the needle is connected to a needle coupling by a first fastener extending through the first upper flange and the second upper flange, a second fastener extending through the first lower flange and the second lower flange, and the curved wall positioned in the tapered groove.

* * * * *